(12) United States Patent
Sørensen et al.

(10) Patent No.: US 6,668,967 B2
(45) Date of Patent: Dec. 30, 2003

(54) METHOD OF STEERING A VEHICLE

(75) Inventors: Ole Vincentz Sørensen, Nordborg; Svend Giversen, Sønderborg; Lars Mortensen, Augustenborg; Johan van Beek, Sønderborg, all of (DK)

(73) Assignee: Sauer-Danfoss Holding A/S, Nordborg (DK)

( * ) Notice: Subject to any disclaimer, the term of this patent is extended or adjusted under 35 U.S.C. 154(b) by 0 days.

(21) Appl. No.: 09/749,524

(22) Filed: Dec. 27, 2000

(65) Prior Publication Data

US 2001/0004952 A1 Jun. 28, 2001

(30) Foreign Application Priority Data

Dec. 27, 1999 (DE) .......................... 199 63 344

(51) Int. Cl.[7] .............................. B62D 53/00; B62D 5/06
(52) U.S. Cl. ................. 180/420; 180/421; 180/422; 180/423
(58) Field of Search .................. 180/418, 420–423, 180/441, 443, 446

(56) References Cited

U.S. PATENT DOCUMENTS 4,293,051 A * 10/1981 Nishikawa ................. 180/421
4,793,431 A * 12/1988 Eto et al. ................... 180/422

* cited by examiner

Primary Examiner—Brian L Johnson
Assistant Examiner—Matthew Luby
(74) Attorney, Agent, or Firm—Barnes & Thornburg

(57) ABSTRACT

The invention concerns a method of steering a vehicle, particularly an articulated vehicle, in which a valve element of a main valve is moved so that it releases or closes connections between a supply connection arrangement and a working connection arrangement in dependence of a steering direction and a steering angle. To improve the steering comfort, the movement speed of the valve element is controlled.

13 Claims, 2 Drawing Sheets

METHOD OF STEERING A VEHICLE

BACKGROUND OF THE INVENTION

The invention concerns a method of steering a vehicle, particularly an articulated vehicle, in which a valve element of a main valve is moved so that it releases or closes connections between a supply connection arrangement and a working connection arrangement in dependence of a steering direction and a steering angle.

In such a method, the driver specifies the steering angle, for example by means of a steering handwheel or a joystick. Depending on the specified steering angle, the valve element, for example a valve slide or a rotary valve slide is moved so that it releases a flow path for hydraulic fluid, which can accordingly reach a steering motor, for example a double-acting cylinder, from a pump. For finishing the steering process, either a measuring motor can be provided, which closes the opening released by the valve element by letting a second valve element follow, or the driver can return the steering angle sensor to the neutral position, so that the valve element closes. To make the invention better understood, the invention will in the following be explained on the basis of the latter example.

In articulated vehicles, the driver usually sits in the area of the articulation point, that is the point of the vehicle, which is moved most in connection with a steering process. Accordingly, also the accelerations of the steering process are the largest here. In most cases, the acceleration in itself is not critical, that is, most people do not find it unpleasant. However, with the change of the acceleration, which should not exceed a certain value, it is different. This acceleration change is also called "jerk". A too large jerk is a load for the body of the driver, which is found unpleasant during a steering movement, particularly when the jerk repeatedly changes its direction. Accordingly, the limitation of the jerk plays a certain role for the improvement of the driver comfort. For example, at the end of the steering process, it will be particularly unpleasant for the driver that after the end of the steering movement the vehicle swings back and forth around the articulation point. This namely means that the jerk swings correspondingly.

SUMMARY OF THE INVENTION

The invention is based on the task of increasing the comfort in connection with the steering.

In a process as mentioned in the introduction, this task is solved in that the movement speed of the valve element is controlled.

The movement speed of the valve element is a measure for, how fast the cross section of the flow path for the hydraulic fluid between the supply connection arrangement and the working connection arrangement can be changed. When the valve element is only moved slowly, this flow path can also only be opened or closed gradually, so that the corresponding acceleration change, including the jerk, is limited to certain values. These values can be set so that they are still found acceptable by a majority of persons from the planned user circuit, for example, construction workers. The modification of the movement speed of the valve element is a relatively simple measure. It can be made inside the main valve and requires no complicated control by means of auxiliary or side valves. The reason is that the movement of the valve element must be controlled anyway. An additional step is that not only the movement in itself, that is the position change of the valve element, but also the kind of change must be influenced.

Preferably, the valve element is electrically activated and the change of the electrical size decisive for the operation is limited. For example, the valve element can be directly moved electrically via a magnet arranged, the current then being limited. The valve element can also be moved electro-hydraulically, a hydraulic pressure firstly being built up or reduced by means of the electrical size. In this case, for example, the voltage of the drive, that is, the pump, can be changed. The change of such an electrical size is in many cases also relatively simply programme controlled, that is, by means of software.

It is also advantageous that the movement speed of the valve element is controlled in dependence of one or more of the following parameters:

Vehicle speed
Vehicle weight
Load distribution
Driver's seat position
Driver profile At high vehicle speeds, it may, for example, be required for security reasons to permit a higher movement speed of the valve element than at low speeds. When the vehicle has a high weight, meaning that the inertia is larger, it may however be expedient to keep the movement speed of the valve element at a low value. It may also be considered, how the vehicle is loaded or where the load is situated, respectively. This is particularly clear in connection with a shovel loader. When the shovel is loaded, a point of the vehicle having the largest distance to the rotating joint is provided with a relatively high inertia. Without countermeasures this would lead to repeated swings, particularly at the end of the steering process. When here the movement speed of the valve element can be influenced, such swings can be avoided and the jerk is reduced. The driver's seat position may have influence on the feeling of the driver, for example, when the distance to the hinge point of the vehicle is changed. The closer the driver is to the hinge point of the vehicle, the more uncomfortable will the side acceleration be to him. Finally, driver profiles can be defined, which each driver can select for himself. Those profiles can then, when a certain driver takes over the vehicle, be read into a control, for example by means of a bar code or a magnetic card.

A preferred, simple way of influencing the movement speed of the valve element is to change the relation between the steering angle specification and the movement path of the valve element. For example, in one case it may be provided that a steering handwheel must be turned 2.75 times to get from the left stop to the right stop. In another case, the same steering movement may be specified to require 4.5 or even 5.5 rotations of the steering handwheel. Of course, this also applies when a joystick is used instead of a steering handwheel. This "transmission" can also be used partially, that is, for smaller steering angles, meaning that it is not necessary for the vehicle to be actually steered from one stop to the other.

In this connection it is particularly preferred that for the change of the movement speed, the time available between two positions of the valve element is set. The shorter this time is, the higher must the speed be. On the other hand, the valve element can work with a lower speed, when it has more time for the displacement. The time as parameter is relatively easy to monitor and preset.

In this connection it is preferred that in the course of time, the movement of the valve element is guided along a preset function. For example, the movement speed can be higher in the middle of a time interval than at the ends.

In a particularly preferred embodiment it is provided that the closing speed of the valve element is limited. Thus, only part of the movement of the valve element is influenced, namely the part, in which the valve element closes. This is usually the critical part, as here a more or less instantaneous closing may cause a high jerk and large swings. At the beginning of the steering movement, the inertia forces of the vehicle are usually sufficient to prevent the acceleration and the acceleration change, that is, the jerk, from being too high.

Preferably, the position of the valve element is controlled in a closed control circuit. Thus, a reliable statement of the position of the valve element is continuously available, and the movement speed is accordingly relatively easy to control.

BRIEF DESCRIPTION OF THE DRAWING

In the following, the invention is described in detail on the basis of the enclosed drawings of a preferred embodiment. The drawings show.

DESCRIPTION OF THE PREFERRED EMBODIMENT

Figure 1:
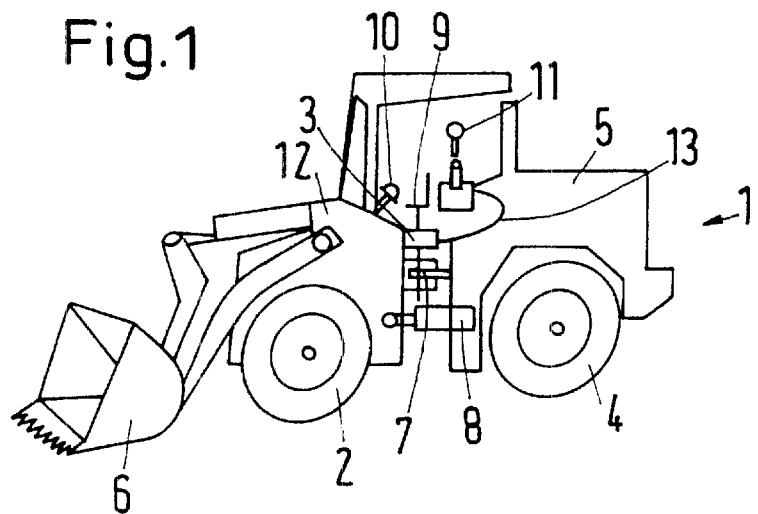
FIG. 1 a schematic view of a front-end loader

FIG. 1 shows a front-end loader or a shovel loader 1, whose front wheels 2 are arranged on a front part 3 and whose rear wheels 4 are arranged on a rear part 5. On the front part a shovel 6 is arranged, whereas in the rear part 5 is arranged a motor, which is not shown in detail. Front and rear parts are connected with each other by way of a joint 7. This joint 7 is situated approximately in the middle of the front-end loader 1. By means of a hydraulic cylinder 8, the front part 3 and the rear part 5 are mutually swingable. Such vehicles are also known as "articulated vehicles". When a steering movement is required, the front part 3 and the rear part 5 are articulated towards each other.

A driver's seat 9 is, as is often the case in such vehicles, arranged above the joint 7. A driver sitting in the driver's seat 9 can operate a steering handwheel 10 or a joystick 11 to steer the vehicle. The corresponding control signals are finally processed in a control device 12, which is shown schematically in FIG. 2. For this purpose, an electric wire 13 may be provided between the joystick 11 and the control device. A hydraulic line 14 serves the purpose of transmitting hydraulic signals from the steering handwheel, of which FIG. 2 shows only the chassis, to the control device 12.

Figure 2:
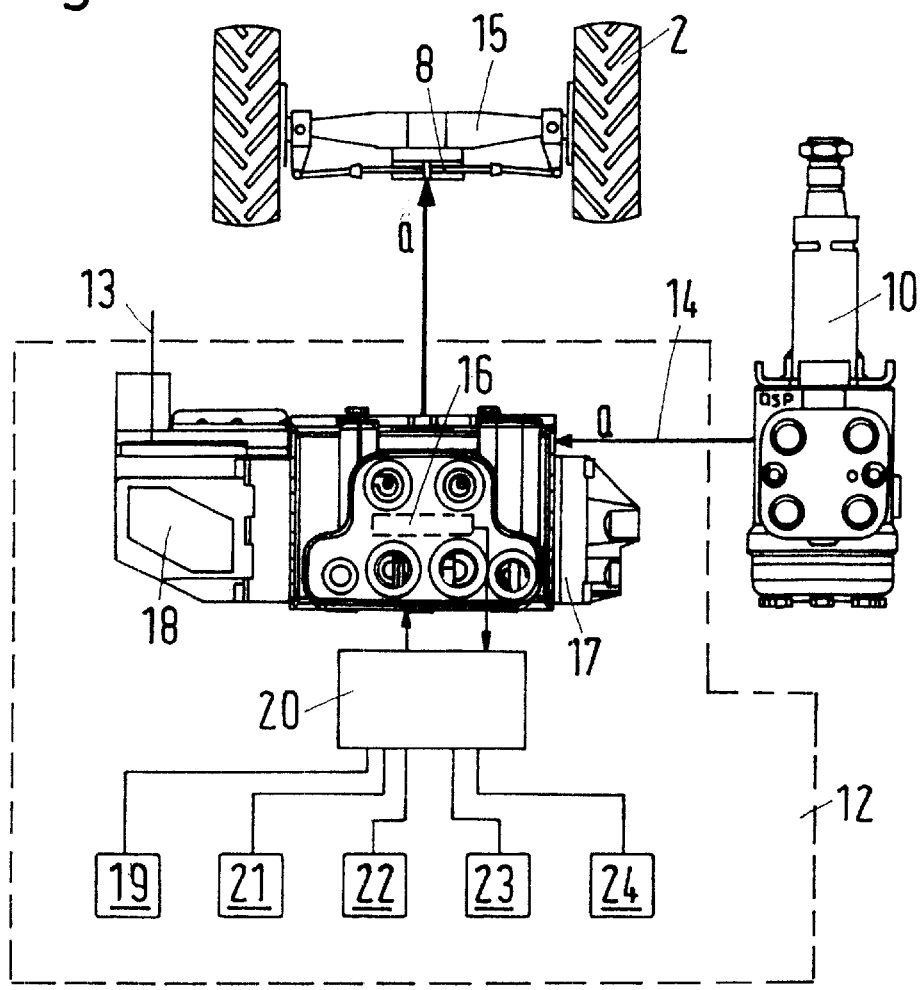
FIG. 2 a schematic view of a steering device

For reasons of clarity, FIG. 2 shows a steering, in which only the front wheels 2 are steered on a shaft 15. Also with such a steering the process described in the following is applicable. However, the process is particularly advantageous with articulated vehicles, as shown, for example, in FIG. 1.

In an articulated vehicle, in which the driver's seat 9 is arranged above the joint 7, a steering causing the two vehicle parts 3, 5 to swing in relation to each other, the driver is exposed to a sideward acceleration. This also applies, when the vehicle stands still. In connection with such a steering movement, depending on the desired steering direction, the cylinder 8 receives hydraulic fluid under pressure causing its piston rod to move in or out. The supply of hydraulic fluid is substantially determined by a valve element 16 in the control device 12. In the embodiment shown, this valve element 16 can be moved in different ways. Firstly, it is possible, via the line 14 to transmit a hydraulic steering signal from the steering handwheel to the valve element 16, so that the valve element 16 moves inside a housing 17. Secondly, it is possible to drive the valve element 16 electrically, for which purpose an electric drive 18 is provided, which can receive signals from the joystick 11 via the line 13.

At the beginning of a movement, the sideward movement of the driver's seat and the corresponding acceleration, which affects the driver, is in most cases tolerable without problems. As the front part 3 and the rear part 5 contain substantial masses, the inertia forces implied do not permit an excessive acceleration. On the other hand, however, the inertia of the mass of front part 3 and rear part 5 is responsible for the fact that the end of a steering movement is often felt to be unpleasant. This is particularly the case, when, for example, the shovel 6 is filled with sand or another heavy material. Via the point of support of the front wheels 2 on the ground, the inertia forces then act upon the joint 7 with a relatively large torque. It can thus be seen that after the end of the steering movement or in connection with a reversal the vehicle starts swinging in the transverse direction, that is, perpendicularly to the driving direction. For the driver, this swinging to and fro causes a heavily changing acceleration. This change of acceleration is also called jerk. As in this case, the acceleration can be equalled to forces acting upon the driver, it can easily be imagined that the changing forces acting upon the driver are uncomfortable to him.

To prevent this phenomenon, or at least to reduce it so much that the driver does no longer find it disturbing, the movement of the valve element 16 is controlled. Or rather, its movement speed is limited, so that, for example, an oil flow (or the flow of another hydraulic fluid) into the cylinder 8 can only decrease by a predetermined speed. Thus, an instantaneous blocking of the movement of the cylinder 8 and an abrupt end of the steering movement can be prevented.

In this connection, the following cases can be distinguished:

When the vehicle is merely controlled via the joystick 11, that is, only electrically via the drive 18, the valve element 16 can in each case be controlled so that an inadmissible jerk is suppressed. In this case, the signals via the line 13 and the corresponding control signals for the limitation of the movement speed of the valve element 16 can namely be combined with each other, and the resulting movement can be controlled so that in fact no inadmissible acceleration or force changes appear.

When, on the other hand, the operation of the valve element 16 takes place almost hydraulically by means of the steering handwheel 10 via the line 14, the movement of the valve element 16 can almost always be acted upon positively. In this case, the control via the hydraulic fluid in line 14 is counteracted by a corresponding electrical drive. As, however, the control by means of the steering handwheel 10 has always the higher priority, it is possible that the electronics, that is, the electrical drive 18, cannot react fast enough. In this case small jerks may appear.

Jerk appears, when the driver finishes the steering. The steering mechanism reacts in dependence of the steering order given and ends its movement. In this instance, the complete mechanism swings, in one embodiment 3 to 6 times. This means that in the same way the jerk changes its direction 3 to 6 times. By acting upon the movement speed of the valve element, the number of swings and the amplitude of the resulting forces can be reduced. This is particularly the case, when the closing speed of the valve element 16 is limited.

However, now it may happen that such a jerk limitation has a negative influence on the controllability of the vehicle. In this case, the influence on the movement speed of the valve element 16 can be made dependent on the vehicle speed, that is, in connection with high speeds, a higher closing speed of the valve element 16 can, for example, be permitted. For this purpose, for example, a speed sensor 19 may be provided, which is connected with the corresponding control device 20, which is ultimately responsible for the control of the speed of the valve element 16.

In a similar way, the total weight of the vehicle influences the jerk. This can be detected via a sensor 21. The heavier the vehicle is, the lower must the movement speed of the valve element 16 be. Alternatively or additionally, the location and the size of the load may also be of importance. In connection with a front-end loader 1, this may, for example, be considered in that a sensor 22 determines whether or not the shovel 6 is loaded.

A sensor 23 determines the distance of the driver's seat 9 and thus the driver from the joint 7. The larger the distance of the driver from the joint 7 is, the smaller is the negative influence of the jerk, and the faster can the valve element 16 close. Finally, a reading device 24 may also be provided, into which a driver can insert a special characteristic, which is adapted to him, for example by means of a bar code or a magnetic card.

Figure 3:
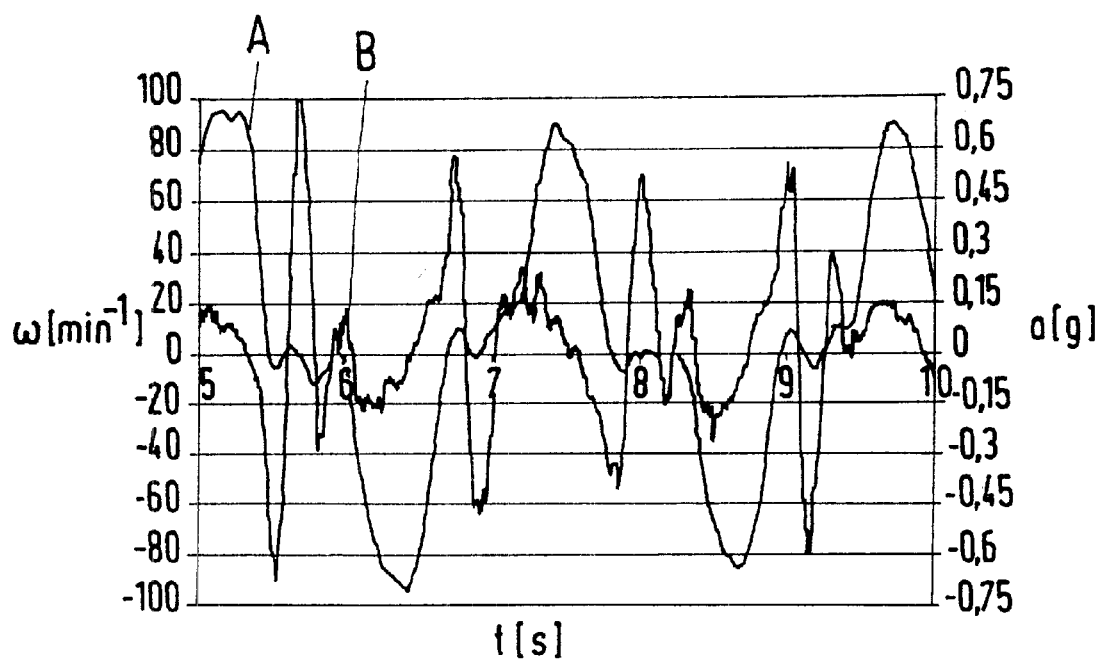
FIG. 3 a schematic view of curve courses without the measures according to the invention FIG. 4 a schematic view of curve courses with the measures according to the invention
Figure 4:
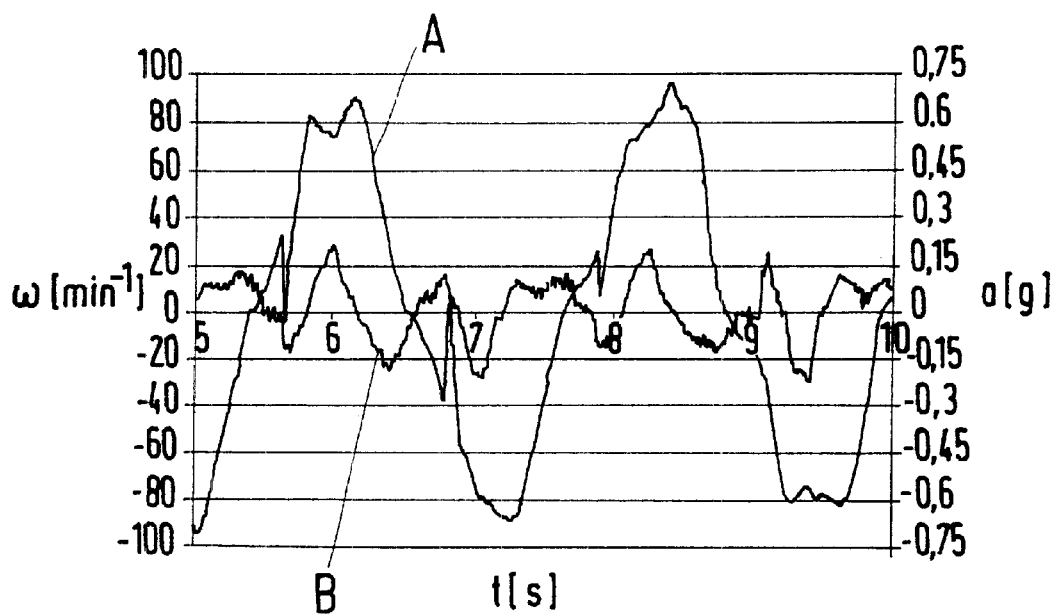

The FIGS. 3 and 4 now show, as comparison, the effects on the acceleration of the driver's seat, when the closing speed of the valve element 16 is limited. Both figures. show with a curve A the rotational speed ω of the steering handwheel 10 (in min$^{-1}$) the movement of the steering handwheel having occasionally small peaks caused by a counter-effect through the vehicle. The scale of the rotational speed ω can be seen from the left side of the diagrams.

A curve B shows the acceleration a (in g). The scale of this is shown in the right side. Both cases show a situation, in which a front-end loader with a shovel 6 full of sand is steered to and fro.

It can be seen that in FIG. 3 the acceleration peaks reaches the range of ±0.6 g or even more and that the acceleration curve has relatively steep sections. Accordingly, corresponding force or load changes influence the driver.

In FIG. 4 the situation is very heavily relieved. The accelerations merely lie in the range ±0.15 g. Thus the forces acting upon the driver only have one-fourth the size of those in FIG. 3.

What is claimed is:

1. Method of steering a vehicle, comprising moving a valve element of a main valve so that it releases or closes connections between a supply connection arrangement and a working connection arrangement in dependence of a steering direction and a steering angle, and controlling the movement speed of the valve element.

2. Method according to claim 1, in which the valve element is electrically activated, and including limiting the change of the electrical signal required for moving the valve element.

3. Method according to claim 1, in which the movement speed of the valve element is controlled in dependence of a least one of the following parameters:

vehicle speed vehicle weight load distribution driver's seat position driver profile.

4. Method according to claim 1, including changing the relation between the steering angle specification and the movement path of the valve element.

5. Method according to claim 3, including setting time available between two positions of the valve element for the change of the movement speed.

6. Method according to claim 5, in which, in the course of time, the movement of the valve element is guided along a preset function.

7. Method according to claim 1, including limiting the closing speed of the valve element.

8. Method according to claim 1, including controlling the position of the valve element in a closed control circuit.

9. In a steered vehicle having a main steering valve with a displaceable valve element which is moved to release or close connections between a supply connection arrangement and a working connection arrangement in dependence on a steering direction and a steered angle, the improvement comprising means for controlling movement speed of the displaceable valve element.

10. A steered vehicle according to claim 9, in which the valve element is electrically activated.

11. A steered vehicle according to claim 10, including means to control the electrical signal required to move the valve element.

12. A steered vehicle according to claim 9, including a control device for controlling the position of the valve element.

13. A steered vehicle according to claim 12, including at least one sensor connected to the control device.

* * * * *